Patented Mar. 7, 1944

2,343,791

UNITED STATES PATENT OFFICE 2,343,791

RECOVERY OF ALKYLATION ACIDS

John A. O'Dell, Baytown, Tex., assignor to Standard Oil Development Company, a corporation of Delaware No Drawing. Application August 27, 1941, Serial No. 408,467

2 Claims. (Cl. 23—172)

This invention relates to improvements in the recovery of sulfuric acid and particularly in the purification and recovery of sulfuric acid that had been used in the alkylation of petroleum hydrocarbons.

In the petroleum refining industry, one of the most common operations is the treatment of oil fractions with sulfuric acid. In all such treatments of oil with sulfuric acid there is formed an acid residue or sludge which is composed of free acid, certain components of the oil which has been treated and chemical combinations of the sulfuric acid and the hydrocarbons. The economical separation of acid from this acid sludge has long been recognized by the petroleum industry as a problem of vital importance. Ordinarily recovery of acid from this acid sludge is a relatively simple matter. This is usually accomplished by dilution of the acidic residue with steam or water, which is usually termed "hydrolysis," followed by agitation with steam or air or by some suitable mechanical means. Addition of water to the acid sludge causes a chemical reaction which liberates an amount of heat which has a desirable effect in recovering free acid from the acid sludge.

Ordinarily, it would be assumed that relatively heavy acid sludges resulting from the treatment of gasoline and heavier fractions with acid would be difficult to resolve into acid and hydrocarbon layers whereas spent acid from catalytic processes such as the hot acid copolymerization would be easily recovered. This is not the case, however, when efforts are made to recover acid from spent sulfuric acid which has been used as a catalyst for the alkylation of isoparaffins with olefins.

After acid has been recovered from the acid sludge by conventional means it is usual practice to concentrate the acid by the conventional method known as the hot air submergence or tower method or by the process employing the drum type of equipment. Combinations of these two types have been used with some success in concentrating acids having unusual quantities of carbon. When these methods were employed in concentrating acids recovered from the spent alkylation acid above a certain strength, however, considerable difficulty was experienced.

In the alkylation of petroleum hydrocarbons, sulfuric acid is used as the catalyst of a strength ranging from 90 to 98%. As the alkylation proceeds, the sulfuric acid gradually loses its strength and activity due to the absorption of water, organic matter and other inert material until the acid is no longer effective as an alkylation catalyst. The spent acid contains on an average about 1% to 10% of organic material. In butene alkylation, sulfuric acid having a titratable acidity of 90% or less concentration is no longer effective while in pentene alkylation acids of a concentration as low as 85% titratable acidity may be used before they have to be replaced. Some spent alkylation acids on analysis show the following compositions:

TABLE 1

Spent alkylation acids

| | | | |
|---|---|---|---|
| Percent water | 3.3 | 2.7 | 2.3 |
| Percent organic matter | 5.0 | 7.0 | 2.9 |
| Percent titratable acidity | 88.9 | 85.3 | 92.0 |
| Percent inert | 2.8 | 5.0 | 2.8 |

These acids though no longer suitable for use as alkylation catalysts have been found to be especially suitable for treating petroleum oils to remove undesirable constituents. Even though these acids are not as strong as acid which has been used heretofore, and which has a titratable acidity of about 90%, the former have been found to be just as effective as treating reagents if equivalent amounts of the two acids are used.

Spent alkylation acids were first recovered by diluting with water and steam in suitable kettles to produce a separated acid of about 35% titratable acidity. As large volumes of the acid were discarded from the alkylation reaction, it became desirable to cut down the amount handled during concentration by decreasing the amount of water added in the hydrolysis step. When this was tried, serious coking in the acid concentrator resulted. The acid discharged from the concentrators was of a jelly-like consistency and was unsuitable for refortification or for use in treating operations. It was, however, found that if the spent acid was diluted to about 40° Baumé or slightly less, a clear acid separated which could be successfully concentrated provided sufficient time was allowed for separation. Settling times of 24 hours or more were needed to allow the carbonaceous material to float to the surface for separation. If the gravity of the separated acid was allowed to fall below about 30° Baumé, considerable amounts of carbonaceous matter settled into the weak acid and was drawn off with it.

It is an object of this invention to provide a more efficient method of recovering the spent alkylation acids. Another object of this invention is to provide a method in which the spent alkylation acid may be used in further reactions which aid in the purification and recovery of the acid and without materially increasing the cost of recovery.

It has been found that if a petroleum acid sludge, from which acid has been recovered, is added to the spent alkylation acid a very rapid separation of the acid into an oily fraction and an acid fraction may be obtained. In carrying out the separation step the spent alkylation acid may be diluted before or after the sludge is added thereto, and the resulting mixture steamed and subsequently settled.

A sludge obtained from the acid treatment of cracked naphtha has been found most satisfactory as the addition agent to aid in the separation of the spent alkylation acid into oil and acid fractions, but other sludges obtained from the reaction of other petroleum products with sulfuric acid are also entirely satisfactory. For example, sludges resulting from a treatment of kerosene, heating oil, lubricating oil and straight run naphtha have been found to give good results when employed in the process of the present invention. The raw acid sludges may be employed as the agent to aid the separation of the spent alkylation acid, or, in the alternative, the oily material separated from hydrolyzed sludges may be employed.

According to one embodiment of the present invention the spent alkylation acid is diluted with an amount of water sufficient to give a weak separated acid of between about 30° and 40° Baumé. Before or during the hydrolysis of the spent alkylation acid, as may be convenient, about one volume of acid sludge (either before or after hydrolysis of the same) is added to about four volumes of spent alkylation acid and the resulting mass is thoroughly mixed in a suitable sludge kettle. The mixture of sludge and spent acid is heated to a temperature in the range from about 140° and 212° F. to facilitate hydrolysis and separation. This is usually accomplished by the introduction of open steam into the kettle. The resulting mixture is allowed to settle for a time sufficient to allow separation of the mixture into two layers: (1) a top layer containing carbonaceous and sludgy material which is separated and utilized as a low grade fuel, and (2) a bottom layer consisting of separated weak acid which is drawn off of the bottom of the kettle to storage for concentration. Generally 1 to 6 hours of settling time is sufficient for a good separation although at times as much as 12 hours was needed.

In order to emphasize the advantages of this process over the method used heretofore, a comparison of the settling times needed to effect separation of acid of strengths between 30° and 40° Baumé are tabulated:

TABLE II

|  | Improved method | Conventional method |
| --- | --- | --- |
| Settling time..................hours.. | 1-12 | 24 or more |

For acids having gravities below about 20° and 30° Baumé, separation of carbonaceous material from the weak acid by the conventional method is difficult and at times impossible.

The advantages of the improved process for recovering spent alkylation acid may be summarized as follows:

(1) For a given acid strength (approximately 40° Baumé or 48%) settling times are reduced from 24 or more hours down to about 6 hours.

(2) Acids having titratable acidities of about 48% (40° Baumé) may be concentrated without coking the concentrators whereas heretofore acids of only 35% (30° Baumé) could be safely handled. The volume of acid concentrated has thus been reduced by about 40%.

Alternately the spent alkylation acid may be used as such for treating a petroleum product which contains undesirable constituents such as unsaturated hydrocarbons.

A cracked naphtha (or other petroleum product which is to be acid treated) is mixed with spent alkylation acid in an amount equivalent to or slightly in excess of the amount of 96% acid normally required in such treating operations and is introduced into a treating stage which may comprise a continuous or batch treating operation. After suitable contact, the treated naphtha is separated from the resulting acid sludge and is further processed. The acid sludge formed during the treating operation comprises spent alkylation acid with a cracked naphtha acid sludge formed in situ. The sludge resulting from the treatment of cracked naphtha with spent alkylation acid is then hydrolyzed by dilution with water to give a weak acid between 30° and 45° Bé. and is introduced into a suitable kettle for separation. In some instances the hydrolyzed sludge may be heated with steam to a temperature between about 140° F. to 212° F.

The hydrolyzed mixture is then separated into three phases: (1) a top layer consisting of hydrocarbons suitable for use as a commercial fuel; (2) a middle layer comprising sludge, tarry hydrocarbons and carbonaceous material which is drawn off and utilized as a low grade fuel; and (3) a bottom layer consisting of weak acid which is pumped to storage for concentration.

Whereas spent alkylation acid was difficult to recover alone when acid sludges from other treating operations were not blended therewith, the acid sludge resulting from the treating operation described herein above is recovered without difficulty and without requiring an additional quantity of extraneous sludge to be added thereto. Evidently the spent alkylation acids, when employed as a treating reagent for petroleum fractions other than the liquefied gaseous hydrocarbons, have preformed therein acid sludge constituents which aid in the recovery operation.

Spent alkylation acid may also be used in treating a petroleum lubricating oil in order to remove the undesirable constituents which tend to form sludge and acidity. It may sometimes be desirable to use slightly elevated temperatures when treating with the spent alkylation acid. The separated sludge resulting from this acid treatment of lubricating oils may be readily hydrolyzed by dilution with water to give a weak acid between 30° and 40° Baumé and treated in a similar manner as the acid recovered from treating cracked naphtha.

I claim:

1. In the recovery of spent sulfuric acid alkylation catalyst of about 85 to 92% titratable acidity and containing about 1 to 10% of organic matter, the catalyst having been used for the alkylation of isoparaffins with olefins, the steps which comprise, diluting the spent acid with an amount of water sufficient to give on separation an acid of about 30°–40° Bé. gravity and adding to approximately four volumes of the spent acid approximately one volume of petroleum acid sludge formed by the sulfuric acid treatment of petroleum products, heating the mixture of spent acid, water and sludge and stratifying whereby the mixture settles in from one to twelve hours into a top oily layer containing the organic material and into a bottom layer of separated diluted acid.

2. In the recovery of spent sulfuric acid alkylation catalyst of about 85 to 92% titratable acidity and containing about 1 to 10% of organic matter, the catalyst having been used for the alkylation of isoparaffins with olefins, the steps which comprise, diluting the spent acid with an amount of water sufficient to give on separation an acid of about 30°–40° Bé. gravity and adding to approximately four volumes of the spent acid approximately one volume of petroleum acid sludge formed by the sulfuric acid treatment of petroleum products, heating the mixture of spent acid, water and sludge and stratifying whereby the mixture settles in from one to twelve hours into a top oily layer containing the organic material and into a bottom layer of separated diluted acid.

JOHN A. O'DELL.